Oct. 30, 1962 P. G. WOOG 3,060,474
WATERTIGHT SEALING MEANS FOR ELECTRIC TOOTHBRUSHES AND THE LIKE
Filed Nov. 29, 1957 2 Sheets-Sheet 1
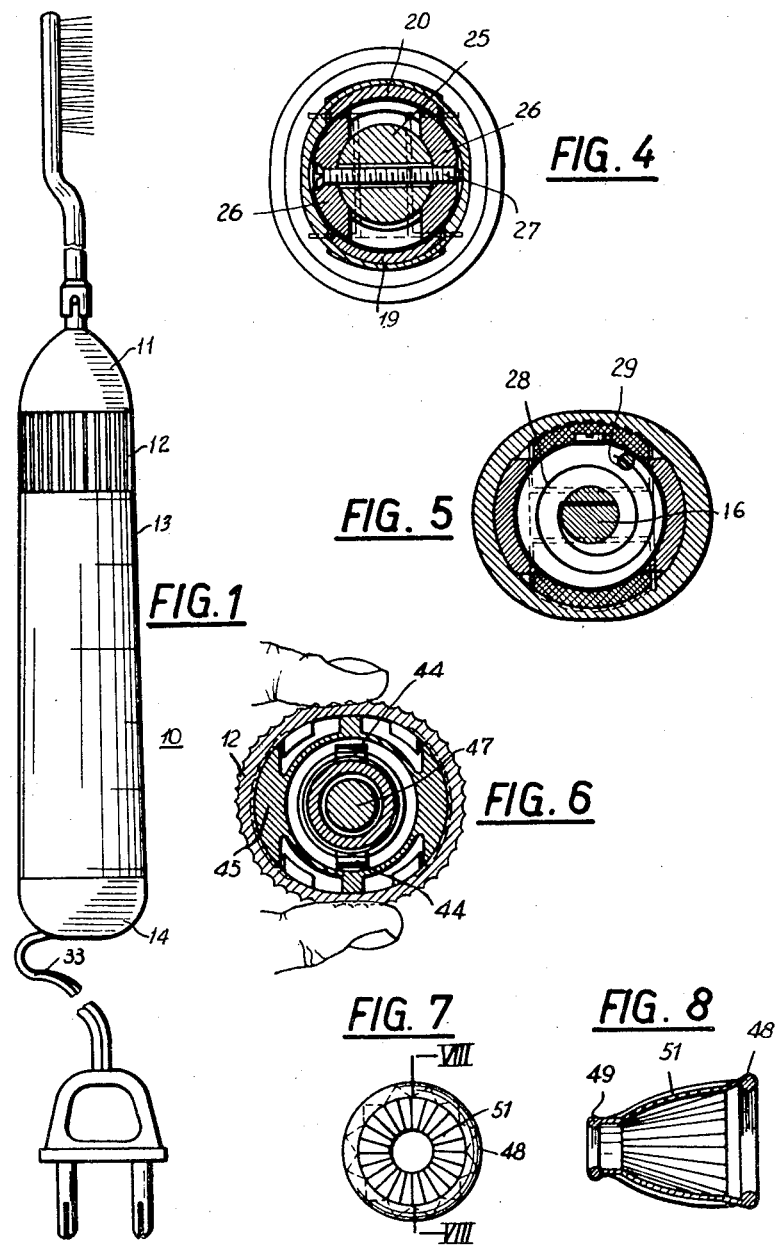
Inventor:
Philippe G. Woog
by: J. Delattre-Seguy
Attorney Oct. 30, 1962  P. G. WOOG  3,060,474
WATERTIGHT SEALING MEANS FOR ELECTRIC TOOTHBRUSHES AND THE LIKE
Filed Nov. 29, 1957  2 Sheets-Sheet 2
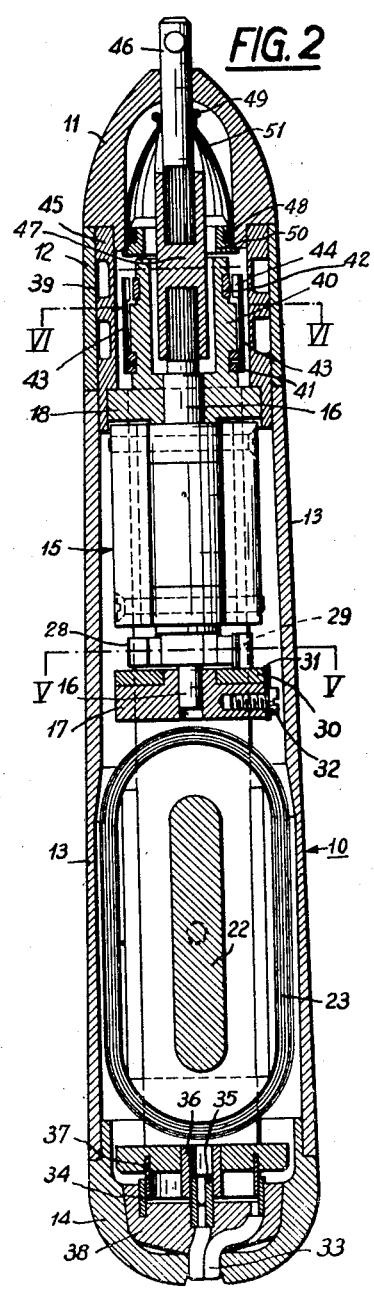
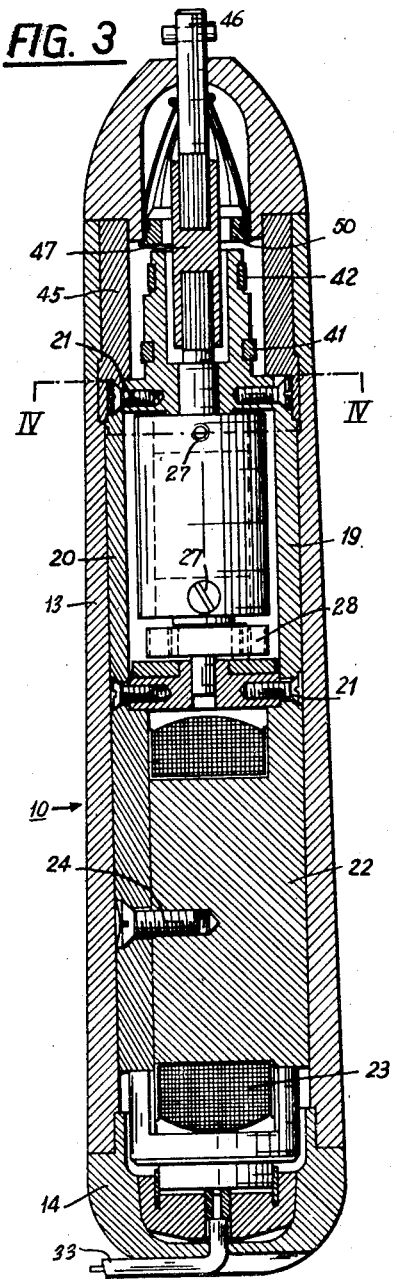
Inventor:
Philippe G. Woog
by: J. Delattre-Seguy
Attorney United States Patent Office 3,060,474
Patented Oct. 30, 1962

3,060,474
WATERTIGHT SEALING MEANS FOR ELECTRIC
TOOTHBRUSHES AND THE LIKE
Philippe Guy Woog, Geneva, Switzerland, assignor to Etablissements Aesup, Vaduz, Liechtenstein, a firm of Liechtenstein
Filed Nov. 29, 1957, Ser. No. 699,580
Claims priority, application Switzerland Feb. 16, 1957
7 Claims. (Cl. 15—22)

This invention relates to an electrically-operated hand appliance for personal care, particularly an electrically-operated toothbrush, and is directed to the provision of a watertight sealing means therefor.

My invention particularly relates to an electrically operated tooth-brush including an elongated casing forming a handle, an electrical motor located inside the casing and a rod projecting outside the casing to which the motor transmits an oscillating movement around its axis, the said rod bearing at its free end the head of the brush. Such a toothbrush is shown in U.S. Patent 2,917,758 issued December 22, 1959, to Held et al. for "Electrically Controlled Toothbrush."

According to an important feature of my invention, the tooth-brush includes a device for providing fluidtightness inside the casing, the said device comprising two resilient rings surrounding respectively the rod and a motionless part of the casing, the said rings being united together on their whole periphery by a membrane of flexible material, neoprene for instance, plaited longitudinally.

Within the broader scope of the invention, the electrically-operated hand appliance for personal care, particularly an electrically-operated toothbrush, includes a substantially watertight casing forming a handle, a shaft accessible from the outside of the casing and adapted for the attachment of an appliance head thereto, and an electric motor in the casing for producing rotation oscillation for the shaft and thereby of the appliance head. Means for insuring a water-tight seal between the rotationally oscillating shaft and the casing are provided comprising a hollow non-reentrant sleeve of thin flexible water-impermeable material encircling the shaft inside the casing and extending therealong a substantial distance to thereby allow relative rotational oscillation of the ends of the sleeve without producing substantial restoring torques. One end of the sleeve is affixed in substantially watertight relationship around the shaft, as by providing the sleeve with a beaded edge fitting tightly around the shaft. The other end is firmly clamped to the inside of the casing by a clamping ring. The sleeve may be pleated longitudinally to reduce restoring torques in operation.

I have illustrated in the accompanying drawings, by way of example, a preferred embodiment of my invention.

In said drawings:

FIG. 1 shows the complete tooth-brush in side-elevation.

FIGS. 2 and 3 show a part of the tooth-brush in longitudinal cross-sectional views in two orthogonal planes.

FIG. 4 is a cross-section through line IV—IV of FIG. 3.

FIGS. 5 and 6 are cross-sections respectively through lines V—V and VI—VI of FIG. 2.

FIGS. 7 and 8 are respectively an end-view and a longitudinal cross-section of a fluidtight sleeve provided inside the casing and around the rod where the latter projects outside the casing.

The tooth-brush illustrated includes an elongated casing 10, the cross-section of which is circular with two slightly flattened opposite sides, which forms a handle and includes four parts: a tip 11, a striated band 12, a sleeve 13 and a bottom 14. These four parts of insulating material are adhesively joined together. Inside the casing 10 is an electrical motor with an oscillating rotor 15, the shaft 16 of which is supported by two bearings 17 and 18 of a non magnetic metal, which are fastened by way of screws 21 to the pole-pieces 19 and 20 of the stator. The pole-piece 19 forms one piece with the core 22 around which the bobbin 23 is wound, while the pole-piece 20 is fastened to the core by means of a screw 24.

The rotor (FIG. 4) comprises a cylindrical magnet 25 and two pole-pieces 26 of magnetic metal secured with two screws 27 to the poles of this magnet.

A spiral spring 28 (FIGS. 2 and 5), one end of which is fastened to the shaft 16 and the other end to an eye 29 of a ring 30, is provided for returning the rotor into a position where the pole-pieces 26 are exactly at mid-distance between the pole-pieces of the stator. The ring 30 is fitted on a cannon of the bearing 17 and a small tongue 31 may be pressed against the ring by a screw 32. This allows the regulating of the angular position of the eye 29 to correctly position the rotor, and tightening ring 30 in place.

This motor, which is to be connected with the public mains, works as follows: the alternating current passing through bobbin 23 creates in the magnetic circuit comprising the core 22, the polepieces 19 and 20 and the rotor an alternating magnetic field. The pole-pieces 26 are then alternately attracted and repelled against the action of the spring 28 and the rotor oscillates at the frequency of the public mains.

The toothbrush as so far described is similar to that of the above U.S. patent.

The bobbin 23 and the control switch 39 are connected in series with the supply-line 33 by way of a double jack formed of four metallic sockets 34—35—36—37. The sockets 34 and 35 and the supply-wires soldered to these sockets are embedded in a plug 38 of thermo-plastic material. The said plug is forced in the bottom 14 of the casing 10 so that the fluidtightness of the latter, where the supply-wires pass through, is perfect.

The switch 39, provided on a small diameter extension 40 of the bearing 18, comprises two metallic rings 41 and 42. The larger diameter ring 41 has two spring blades 43 attached thereto at diametrally opposed points, corresponding to the smallest transversal dimension of the casing 10. The spring blades 43 are provided at their free ends with respective contacts 44. These blades 43 are located inside a sleeve 45 parallel to and near the internal wall of the latter. The said sleeve 45 of plastic material is grooved near the blades 43 in order to increase its flexibility. It is mounted in the striated band portion 12 of the casing. The bearing 18 engages one end of this sleeve, and the other end is inserted between a bearing surface of the tip 11 of the casing and the internal side of the striated band 12.

The shape of the casing 10 is made so that the user holds it naturally with his finger and thumb on the portion of the striated band adjacent the switch blades, as shown in FIG. 6. In order to actuate the brush, it is sufficient to exert a slight radial pressure on the striated band to flatten the sleeve 45, the internal side of which makes the blades 43 deflect until the contacts 44 touch the ring 42.

The shaft 16 extends into the hollow extension 40 of bearing 18, and is made rigid with the rod 46 of the brush through a permanent connection comprising a sleeve 47 molded around the adjacent ribbed ends of shaft 16 and rod 46.

As will be understood, it is important in a device of this character to prevent water or other liquid from entering the casing and coming in contact with the operating mechanism, and particularly the electrical portions thereof. While the casing itself can be made watertight, as described above, shaft 46 must necessarily rotate with respect to the casing and hence water, etc. could pass around the shaft into the casing.

In accordance with the present invention the fluidtightness of the casing at its end where the rod 46 passes therethrough is ensured by a device mounted inside the tip 11 of the casing. As shown, this device comprises a hollow flaring non-reentrant sleeve 51 of a thin flexible material. The sleeve may be pleated longitudinally to allow easy deformation when the ends thereof are rotated relative to each other in operation. Resilient beaded edges 48 and 49 are provided at the ends of the sleeve. The beaded edge 49 fits tightly around the shaft 46 in watertight relationship therewith. Beaded edge 48 is firmly clamped to the inside of tip 11 of the casing by ring 50.

This device is very effective and presents over the known devices the advantage of absorbing practically no energy. The known devices have generally a braking effect on the rotating or oscillating parts of which they ensure the fluidtightness.

The assembly of the brush is extremely easy; all the parts to be located inside the casing are first mounted together and then inserted in the casing through its open base which is sealed afterwards. The fact that no metal part (screws, switch, etc.) passes through the wall of the casing ensures a perfect electrical insulation of the brush and a reliable fluidtightness.

One of the most suitable thermoplastic materials for the construction of this brush would be neoprene.

What I claim is:

1. In an electrically-operated hand appliance for personal care including a substantially watertight casing forming a handle, a shaft accessible from the outside of said casing and adapted for the attachment of an appliance head thereto, and an electric motor in said casing for producing rotational oscillation of said shaft and thereby of said appliance head, means for insuring a watertight seal between said rotationally oscillating shaft and said casing which comprises a hollow non-reentrant sleeve of thin flexible water-impermeable material encircling said shaft inside said casing and extending therealong a substantial distance to thereby allow relative rotational oscillation of the ends of the sleeve without producing substantial restoring torques, said sleeve having a beaded edge at one end thereof fitting tightly around said shaft, the other end of said sleeve engaging an inner annular surface of the casing which extends generally in the direction of said shaft, and a clamping ring inside the said other end of the sleeve and firmly clamping said other end to said inner annular surface of the casing, said sleeve flaring outwardly away from said shaft between the points of attachment to the shaft and the casing and being substantially spaced from shaft and casing to avoid rubbing contact therewith during operation, whereby a watertight seal is provided while allowing free rotational oscillation of said shaft.

2. In an electrically-operated hand appliance for personal care including a substantially watertight casing forming a handle, a shaft accessible from the outside of said casing and adapted for the attachment of an appliance head thereto, and an electric motor in said casing for producing rotational oscillation of said shaft and thereby of said appliance head, means for insuring a watertight seal between said rotationally oscillating shaft and said casing which comprises a thin hollow flexible non-reentrant sleeve of water-impermeable material encircling said shaft inside said casing and extending therealong a substantial distance to thereby allow relative rotational oscillation of the ends of the sleeve without producing substantial restoring torques, said sleeve having beaded edges at each end thereof, the beaded edge at one end fitting tightly around said shaft, the beaded edge at the other end of said sleeve engaging an inner annular surface of the casing which extends generally in the direction of said shaft, and a clamping ring inside the said other end of the sleeve and firmly clamping the beaded edge thereof to said inner annular surface of the casing, said sleeve flaring outwardly away from said shaft between the points of attachment to the shaft and the casing and being substantially spaced from shaft and casing to avoid rubbing contact therewith during operation, whereby a watertight seal is provided while allowing free rotational oscillation of said shaft.

3. In an electrically-operated hand appliance for personal care including a substantially watertight casing forming a handle, a shaft extending through said casing and adapted for the attachment of an appliance head thereto, and an electric motor in said casing for producing rotational oscillation of said shaft and thereby of said appliance head, means for insuring a watertight seal between said rotationally oscillating shaft and said casing which comprises a thin hollow flaring flexible non-reentrant sleeve of water-impermeable material encircling said shaft inside said casing and extending therealong a distance at least equal to the diameter of the larger end thereof to thereby allow relative rotational oscillation of the ends of the sleeve without producing substantial restoring torques, said sleeve having beaded edges at each end thereof, the smaller diameter beaded edge being toward the point of exit of said shaft from said casing and fitting tightly around said shaft, the larger diameter beaded edge engaging an inner annular surface of the casing which extends generally in the direction of said shaft, and a clamping ring inside the larger diameter beaded edge and firmly clamping the edge to said inner annular surface of the casing, said sleeve flaring outwardly away from said shaft between the points of attachment to the shaft and the casing and being substantially spaced from shaft and casing to avoid rubbing contact therewith during operation, whereby a watertight seal is provided while allowing free rotational oscillation of said shaft.

4. In an electrically-operated toothbrush including a substantially watertight casing forming a handle, a shaft extending through said casing and adapted for the attachment of a brush head thereto, and an electric motor in said casing for producing rotational oscillation of said shaft and thereby of said brush head, means for insuring a watertight seal between said rotationally oscillating shaft and said casing which comprises a thin hollow flaring flexible non-reentrant sleeve of water-impermeable material encircling said shaft inside said casing and extending therealong a distance at least equal to the diameter of the larger end thereof to thereby allow relative rotational oscillation of the ends of the sleeve without producing substantial restoring torques, said sleeve having beaded edges at each end thereof, the smaller diameter beaded edge being toward the point of exit of said shaft from said casing and fitting tightly around said shaft, the larger diameter beaded edge engaging an inner annular surface of the casing which extends generally in the direction of said shaft, and a clamping ring inside the larger diameter beaded edge and firmly clamping the edge to said inner annular surface of the casing, said sleeve flaring outwardly away from said shaft between the points of attachment to the shaft and the casing and being substantially spaced from shaft and casing to avoid rubbing contact therewith during operation, whereby a watertight seal is provided while allowing free rotational oscillation of said shaft.

5. The combination in accordance with claim 4 in which said sleeve is longitudinally pleated.

6. In an electrically-operated hand appliance for personal care including a substantially watertight casing forming a handle, a shaft extending through one end of the casing and adapted for the attachment of an appliance head thereto, an electric motor in said casing for producing rotational oscillation of said shaft and thereby of said appliance head, and movable means inside said casing near said one end for controlling oscillation of said shaft and actuable from the outside of the casing, means for insuring a watertight seal between said rotationally oscillating shaft and said casing which comprises a hollow flaring flexible non-reentrant sleeve of water-impermeable material encircling said shaft inside said casing and extending therealong a substantial distance, said sleeve being positioned between said movable means and said one end of the casing and having beaded edges at each end thereof, the smaller diameter beaded edge being near the point of exit of said shaft from the casing and fitting tightly around the shaft, the larger diameter beaded edge being away from said point of exit and engaging an inner annular surface of the casing which extends generally in the direction of said shaft, and a clamping ring inside the larger diameter beaded edge and firmly clamping the edge to said inner annular surface of the casing, said sleeve flaring outwardly away from said shaft between the points of attachment to the shaft and the casing and being substantially spaced from shaft and casing to avoid rubbing contact therewith during operation.

7. In an electrically-operated hand appliance for personal care including a substantially watertight casing forming a handle, a shaft accessible from the outside of said casing and adapted for the attachment of an appliance head thereto, and an electric motor in said casing for producing rotational oscillation of said shaft and thereby of said appliance head, means for insuring a watertight seal between said rotationally oscillating shaft and said casing which comprises a hollow non-reentrant sleeve of thin flexible water-impermeable material encircling said shaft inside said casing and extending therealong a substantial distance to thereby allow relative rotational oscillation of the ends of the sleeve without producing substantial restoring torques, one end of said sleeve being affixed in substantially watertight relationship around said shaft, the other end of said sleeve engaging an inner annular surface of the casing which extends generally in the direction of said shaft, and a clamping ring inside the said other end of the sleeve and firmly clamping said other end to said inner annular surface of the casing, said sleeve flaring outwardly away from said shaft between the points of attachment to the shaft and the casing and being substantially spaced from shaft and casing to avoid rubbing contact therewith during operation, whereby a watertight seal is provided while allowing free rotational oscillation of said shaft.

References Cited in the file of this patent
UNITED STATES PATENTS

| | | |
|---|---|---|
| 459,332 | Nash | Sept. 8, 1891 |
| 858,557 | Banning | July 2, 1907 |
| 1,006,770 | Messlin | Oct. 24, 1911 |
| 1,807,139 | Volodimirov | May 26, 1931 |
| 1,959,259 | Zerk | May 15, 1934 |
| 1,965,382 | Kluge | July 3, 1934 |
| 2,044,863 | Sticht | June 23, 1936 |
| 2,158,738 | Baker | May 16, 1939 |
| 2,472,010 | Gilman | May 31, 1949 |
| 2,520,288 | Shand et al. | Aug. 29, 1950 |
| 2,646,067 | Smith | July 21, 1953 |
| 2,657,321 | Smithson | Oct. 27, 1953 |